United States Patent

[11] 3,604,411

| [72] | Inventor | Graham Travers Schuler<br>Ottawa, Ontario, Canada |
|------|----------|---------------------------------------------------|
| [21] | Appl. No. | 833,420 |
| [22] | Filed | June 16, 1969 |
| [45] | Patented | Sept. 14, 1971 |
| [73] | Assignee | Canadian Patents and Development Limited<br>Ottawa, Ontario, Canada |

[54] ELECTROENCEPHALOGRAPH HAVING METER PROBE MOVABLE IN A CALVARIUM-SHAPED LIQUID FILLED TANK AND METHOD OF USE
4 Claims, 6 Drawing Figs.

| [52] | U.S. Cl. | 128/2.1 B |
| [51] | Int. Cl. | A61b 5/05 |
| [50] | Field of Search | 128/2.06 R, 2.06 V, 2.1 B, 2.1 R, DIG. 4 |

[56] References Cited
UNITED STATES PATENTS

| 2,549,836 | 4/1951 | McIntyre et al. | 128/2.1 B |
| 2,712,309 | 7/1955 | Offner | 128/2.1 B |
| 2,760,105 | 8/1966 | Michaels | 128/2.1 B |
| 3,367,323 | 2/1968 | Schuler | 128/DIG. 4 |
| 3,411,495 | 11/1968 | Casby | 128/2.1 B |

Primary Examiner—William E. Kamm
Attorney—James R. Hughes

ABSTRACT: An electroencephalograph wherein movable electrodes are attached to positions on a scalp corresponding to the positions of fixed electrodes on an inverted, calvarium-shaped hollow member of electrical insulating material, for example, methyl methacrylate. Differences between electrical potentials in each of the movable electrodes are amplified and passed to the corresponding fixed electrode, so that by moving a probe around in a saline solution in the hollow member an indication of the distribution of electrical potential of the brain may be obtained.

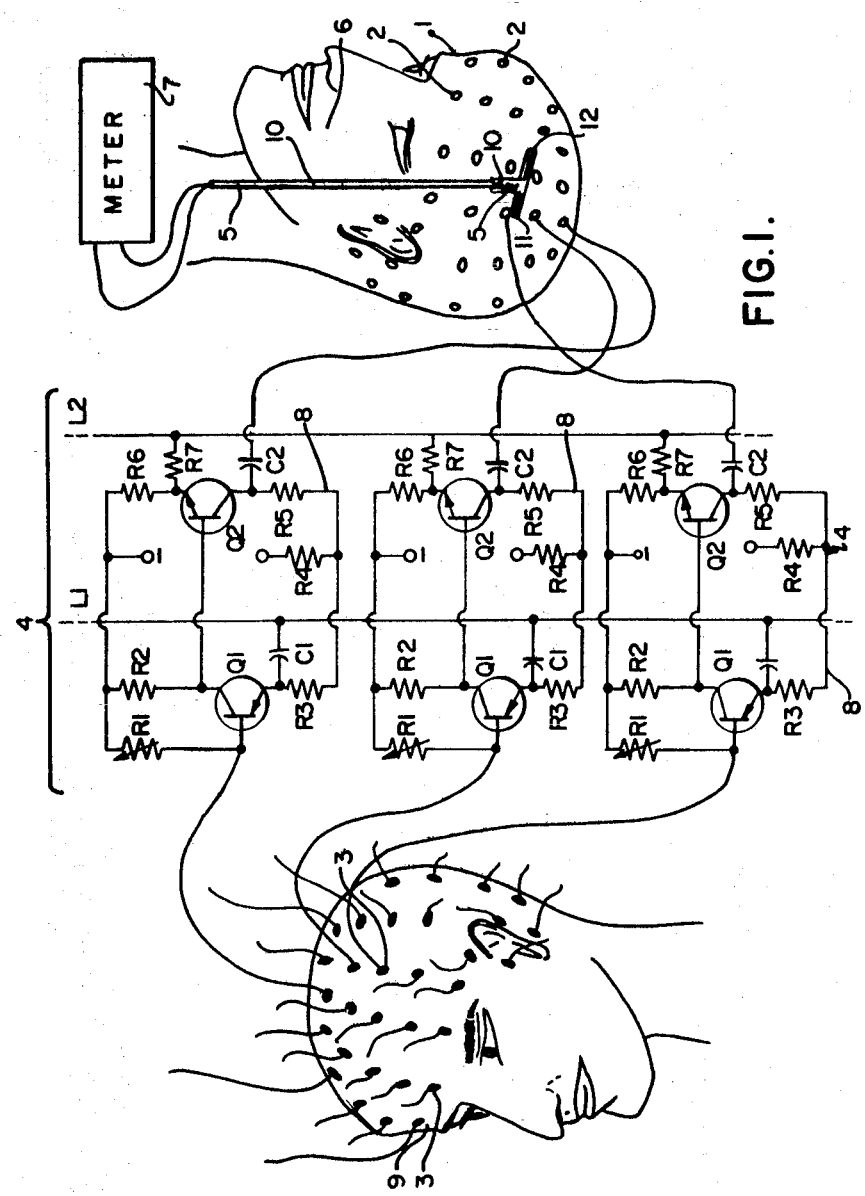

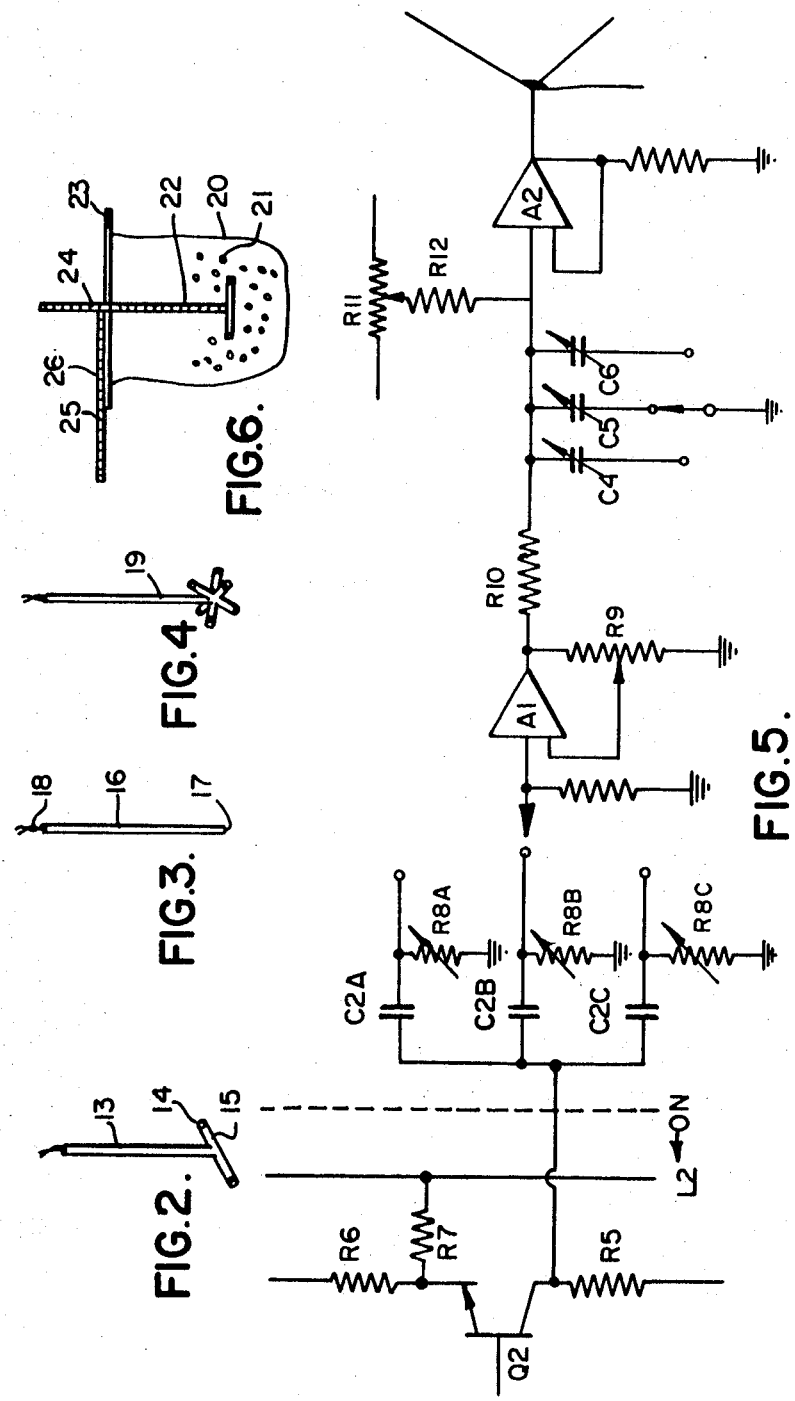

3,604,411

ELECTROENCEPHALOGRAPH HAVING METER PROBE MOVABLE IN A CALVARIUM-SHAPED LIQUID FILLED TANK AND METHOD OF USE

This invention relates to an electroencephalograph apparatus and a method of obtaining electroencephalograph readings.

There is a need of the voltage signal patterns of the brain to be determined in a better manner. This need is created in order that:

1. The normal functions of the brain may be better understood.
2. Abnormal brain functions associated with mental illness, epilepsy, tumors and vascular calamities need to be understood to a greater extent to provide better treatment.

It is an object of the invention to provide an electroencephalograph apparatus and method of use providing readings from which the voltage signal patterns of the brain can be determined in a better manner.

Common types of electroencephalograph apparatus use 16 or less channels of data to display voltage signals present between different positions on the portion of the scalp covering the brain, and the readings thus obtained are usually sufficiently insensitive as to permit a diagnosis of a patients condition when considered in conjunction with other abnormal conditions of the patient. Using common types of electroencephalograph apparatus, most epileptic, tumor, or stroke conditions cannot be diagnosed, and only under exceptional circumstances does a psychotic present a distinctive encephalographic record from which a diagnosis can be made.

It is further object of the invention to provide an electroencephalograph apparatus and method of use giving sufficiently sensitive readings to provide a useful encephalographic record from which a diagnosis may be obtained.

A further drawback with known electroencephalograph apparatus is that the voltage signals produced by them from the voltage signals from the scalp lack specificity because of the limited spatial resolving power and frequency response of the apparatus. Thus potentially valuable information in the voltage signals from the scalp is not discernable by known types of electroencephalograph apparatus and so is not recorded in a discernable form.

It is a further object of the invention to provide an electroencephalograph and method of use whereby potentially valuable information in voltage signals from the scalp, which was previously indescernable is discernable.

A further disadvantage of known electroencephalographic apparatus is that voltage signals acquired from the scalp surface are eventually presented as simple scalp surface signals to the interpreter who, without assistance from the apparatus, attempts a subjective determination of their site of origin within the brain. Occasionally, the proximity of a peculiar voltage signal to the scalp will give some degree of directivity, but only in the broadest terms.

It is a further object of the invention to provide an electroencephalograph apparatus and method of use which will indicate the different voltage signals produced in a different portion or portions of the brain.

The desire for a more sensitive and direct approach to voltage signals from the brain has led to the occasional use of small electrodes being inserted directly into the brain substance, but surgical techniques must be employed to obtain these voltage signals which, for all the danger and destruction involved, provide little routine useful information.

The invention provides an electroencephalograph apparatus, comprising a hollow calvarium-shaped member of an electrical insulating material, a plurality of fixed electrodes distributed over and attached to said member, each fixed electrode having an end portion exposed to the hollow interior in said member, a plurality of movable electrodes providing a movable electrode for each said fixed electrode, voltage signal amplifying means electrically connecting each movable electrode to the corresponding fixed electrode therefore, such that differences only in voltage signals applied to each movable electrode relative to the average of the voltage signals applied to the movable electrodes, will be amplified to a detectable magnitude and applied to the corresponding fixed electrode, a sensing probe movable within said hollow interior, for detecting voltage differences in an electrically conducting liquid when one is placed in said member, said voltage differences being produced therein by said fixed electrodes, and means for indicating said voltage potential detected by said probe, whereby each said movable electrode may be electrically connected to the corresponding position on the scalp of a living body to the position of the corresponding fixed electrode thereto on said member, an electrically conductive liquid may be placed in said hollow to cover said exposed end portions of the fixed electrodes, said probe may be moved within said liquid to detect a substantially equivalent voltage field therein to that of the brain within said calvarium, and differences in said field may be indicated by said means for indicating said voltage differences.

The invention also provides a method of obtaining elecroencephalograph readings, comprising positioning movable electrodes on the calvarium of a living body to obtain voltage signals therefrom, amplifying differences only in voltage signals applied to each movable electrode, relative to the average of the voltage signals applied to the movable electrodes, applying each of said differences in voltage signals to a corresponding one of a plurality of stationary electrodes occupying similar positions on the interior of a hollow calvarium-shaped member containing an electrically conducting liquid in contact with end positions of said stationary electrodes, detecting voltage differences in said liquid by means of a movable probe therein, and measuring said voltage differences.

In the accompanying drawings which illustrate, by way of example, embodiments of the invention, FIG. 1 is a schematic view of an electroencephalograph apparatus connected to a patient, with a portion of the electrical circuitry shown, FIG. 2 is a different probe for use with the apparatus shown is FIG. 1, FIG. 3 is a further different probe for use with the apparatus shown in FIG. 1, FIG. 4 is yet a further different probe for use with the apparatus shown in FIG. 1, FIG. 5 is a portion of a signal conditioning circuit for use with the apparatus shown in FIG 1, and FIG. 6 is a probe position indicating device for use with the apparatus shown in FIG. 1.

In FIG. 1 there is show a hollow calvarium-shaped member 1 of an electrical insulating material, in this instance transparent methyl methacrylate resin, a plurality of fixed electrodes 2 distributed over and attached to the member 1, each fixed electrode 2 having an end portion exposed to the hollow interior in the member 1, a plurality of movable electrodes 3 providing a movable electrode 3 for each fixed electrode 2, voltage signal amplifying means, generally designated 4, electrically connecting each movable electrode 3 to the corresponding fixed electrode 2, such that differences only in voltage signals applied to each movable electrode, relative to the average of the voltage signals applied to all the movable electrodes, will be amplified to a detectable magnitude and applied to the corresponding fixed electrode, a sensing probe 5 movable within the hollow interior of the member 1, for detecting voltage differences in an electrically conducting liquid 6 when one is placed in the member 1, the voltage differences being produced therein by the fixed electrodes 2, and means, for example, a galvanometer for indicating said voltage potentials detected by the probe 5.

The member 1 is shown shaped to the whole of a human head whereas, in practice, only the calvarium containing the brain is required. The member 1 may be shaped to the shape of a calvarium containing the brain of an animal from which an electroencephalograph is required, for example, the member 1 may be shaped to at least the calvarium of a monkey. The member 1 may be of other transparent materials than methyl methacrylate resin, for example, the member 1 may be of glass, or another transparent plastic material which is electrically insulating. As will be described later the member 1 need not be transparent, and in such instances may be of any suitable electrical insulating material, for example, a natural or synthetic plastic material, a ceramic material, or even of a skullbone with the ear, eye and nose etc., apertures sealed. The fixed electrodes 2 are preferably studs of a metal, such as copper or sliver, having a high electrical conductivity. The fixed electrodes are sealed within apertures in the wall of the member 1 in a liquid-tight manner.

The movable electrodes 3 are preferably studs of a metal, such as gold, silver, or copper plated with gold or silver, which have a high electrical conductivity and which will not affect a patients skin deleteriously.

The voltage signal amplifying means 4 comprises a plurality of two-stage amplifying circuits 8. The amplifying circuits 8, are matched for voltage gain, phase shift, frequency attenuation characteristics, and to be unaffected by varying impedances of member 1. An amplifying circuit 8 is provided for each movable electrode 3 and electrically connects that movable electrode to its corresponding fixed electrode 2.

Each amplifying circuit 8 comprises two transistor amplifiers $Q_1$ and $Q_2$, a variable resistance $R_1$, resistances $R_2$, $R_3$, $R_4$, $R_5$, $R_6$ and $R_7$ and capacitors $C_1$ and $C_2$.

The probe 5 comprises a hollow, inverted T-shaped member 10 of an electrical insulating material, with electrodes 11 and 12 sealed in a liquid-tight manner in the ends of arms of the member 10. The electrodes 11 and 12 are electrically connected to the meter 7.

In operation the apparatus is arranged as shown with the movable electrodes attached to and in electrical contact with the head 9 of a patient and the member 1 is filled with liquid 6 in the form of a weak saline, aqueous solution to above the level of the stationary electrodes 2. Voltage impulses from the patients head 9 are conveyed from each movable probe 3 as input signals to the corresponding amplifier circuit 8. Each variable resistance $R_1$ has an impedance of many megohms so that its impedance will not load the input signal from the corresponding movable electrode 3. Each variable resistance $R_1$ is adjusted to precisely supply the required base current for the associated transistor $Q_1$ so that a negligible direct current will flow between each amplifier circuit 8 and the corresponding movable electrode. Resistors $R_2$ and $R_3$ are precisely chosen to provide a high AC and DC input impedance, as well as providing the most favorable compromise in first stage gain, input impedance and first stage noise. $R_4$ being common to transistor $Q_1$ and $Q_2$ develops a DC negative feedback. $R_5$ and $R_6$ are chosen to provide high-gain low noise and stable operating conditions for transistor $Q_2$. The resistor $R_7$ in coupling the emitter of transistor $Q_2$ to a common floating reference line $L_2$, affords the rejection of all common signals presented to all transistor $Q_2$. $R_7$ provides a low impedance path for desirable signals which affords increased gain for transistor $Q_2$. Capacitor $C_1$ is especially fabricated to have capacitance i the millifarad range and is selected for its low noise and low leakage properties. The capacitors $C_1$, in connect the input transistors to a common floating reference line $L_1$. Reference line $L_1$ provides a negative feedback means for effectively eliminating most unwanted common mode input voltage signals and also provides a low impedance path on which the desirable input signals are averaged so that each transistor $Q_1$ amplifies only between its input signal and differences from the average of all of the input signals. "Thus the reference line $L_1$ provides a negative feedback and voltage signal averaging means." The capacity of capacitor $C_1$ is chosen to achieve a first stage attenuation of undesirable low frequency signals without creating low-frequency noise. Capacitor $C_2$ serves to isolate the corresponding fixed electrode 2 from unwanted low frequency and steady potentials so that the amplified differences only of the input signals are passed to the fixed electrodes 2. Transistors $Q_1$ and $Q_2$ are especially selected to provide high gain and low noise amplification.

The amplified input signals from the amplifying circuits 8 which are applied to the fixed electrodes 2 provide a voltage distribution in the liquid which will give an indication of the position of a lesion or discrete signal generator within the patients brain, by determining the position in the liquid 6 of a relatively greater voltage than that present in the remainder of the liquid 6.

Thus by moving the probe 5 to search in the liquid 6 for the rise in voltage indicated by the difference between the voltages applied to the electrodes 11 and 12 and shown on the meter 7, an indication is obtained of the voltage distribution in the patients brain.

The signal applied to fixed electrode 2 enable a signal distribution in the liquid 6 which will, due to their incoherence, attenuate unwanted signals such as those from independent noise sources, and from the independent surfaces of the brain directly subjacent to moveable electrode 3. However largely coherent signals as those arising from discrete areas in the brain, are not resistively degraded in the liquid of member 1. By this means, the detection of signals from the depths of the brain is facilitated.

It should be noted that the voltage differences in the liquid 6 do not necessarily represent an equivalent, amplified version of the voltage differences present in the patient's brain. The voltage differences in the liquid 6 will indicate a particular voltage source in the patients brain but, the source will not necessarily be in the equivalent position in the brain to that of the greatest voltage in the member 1. However, for a voltage source in a particular position in a subjects brain the corresponding greater voltage in the liquid 6 will occur in roughly the same position for a similar source in another subjects brain.

The liquid 6 may be any electrical conducting liquid, in fact tap water has been found to be suitable.

The member 1 may be of any electrical insulating material but is preferably of a moldable plastic insulating material for ease of manufacture. As the size and shape of calvaria vary from one patient to another the member 1 is shaped as a standard and for this reason the location of a voltage signal in the liquid therein will probably give an accuracy for the position of the equivalent voltage signal in the brain of the patient to within not less than say 5 m/m.

As an example of the magnitude of the voltages involved, a voltage signal of 10 microvolts from the head of a patient will give a voltage signal of the magnitude of 1 volt in using a saline solution containing 0.010 percent by weight of slat. This will enable the probe to detect a millivolt signal from the replica of the calvarium.

The number of amplifying circuits 8 that are used may vary from as few as four to over 100, depending upon the number of movable electrodes 3 employed. The voltage signal fidelity and directivity is enhanced by a larger number of movable electrodes 3.

With the apparatus described above the probe 5 can only detect different voltage signals from the brain of the patient over the period of time required to move the probe around in the liquid 6 to locate the different magnitude of voltage therein. In some instance it may be desirable to observe the various voltage signals emitted from the brain of the patient at a given instant. This may be done by recording either the voltage signals applied to the stationary electrodes or those acquired from many probes such as probe 16, and later subjecting the signals to analysis either directly or by means of a computer.

The probe 5 is used for detecting voltage differences in the liquid 6 in one plane, and various other probes may be provided to detect voltage differences in other manners.

In FIG. 2 a probe 13 is shown which is similar to the probe 5 except that the arms 14 and 15 are inclined at an angle of 45 to the normal of the longitudinal axis of the upwardly extending arm of the probe 13. The probe 13 facilitates the detection of voltage differences existing at different levels in the liquid 6.

In FIG. 3 there is shown a probe 16 having one electrode 17. The probe 16 is constructed from a tube of an electrical insulating material and the electrode 17 is secured in the end of the tube in a liquid-tight manner. A insulated electrical conductor 18 is electrically connected t the electrode 17 to connect it to a device, such as an oscilloscope, which will indicate the difference between the voltage within the liquid 6 (FIG. 1) with respect to a remote average "ground" voltages applied to the fixed electrodes 2.

In FIG. 4 a probe 19 is shown which is similar to the probe 5 (FIG 1) except that the probe 19 has six electrodes disposed as three pairs, each pair of electrodes being in a plane at right angles to the planes in which the other pairs are disposed. The probe 19 facilitates measuring a three dimensional vector loop indicating the average location of maximal signal potential energy.

The amplifying circuits 8 shown in FIG. 1 are simplified for clarity. The requirements that these amplifying circuits have identical voltage gains, phase shifts, frequency attenuation characteristics, and be unaffected by the impedance of the member 1, may in theory be minimally satisfied by appropriate values for capacitors $C_1$ and $C_2$, and resistances $R_2$, $R_3$ and $R_7$.

Referring now to FIG. 5 there is shown an amplifying circuit which makes use of standard equipment which is readily available commercially, and which is inserted in the amplifier circuit 8 (FIG. 1) in place of capacitor $C_2$. Capacitors $C_{2A}$, $C_{2B}$, $C_{2C}$ with associated resistors $R_{8a}$, $R_{8B}$ and $R_{8c}$ provide a variety of low-frequency attenuation characteristics which may be adjusted to give each amplifier identical low frequency attenuation and phase shift properties. Operational amplifier $A_1$ and associated resistor $R_9$ provide flexibility in achieving a wide variety of amplifier gains which may be easily standarized. Resistor $R_{10}$ and associated capacitors $C_4$, $C_5$ and $C_6$ similarly provide a variety of matched high frequency characteristics. Resistors $R_{11}$ and $R_{12}$ association with operational amplifier $A_2$ pass the desired signal to the corresponding fixed electrode 2 at a very low impedance and with a negligible net average current output.

The requirement of low signal distortion is met by eliminating input blocking capacitors by the use of $R_1$ and $C_1$, eliminating interference signals with the use of $C_1$, $L_1$, and $L_2$, and the use of low noise components selected to provide high input and low output impedances.

The requirement that each amplifier must amplify only the voltage signal difference between each movable electrode 3 and the average of all of the voltage signals is satisfied by the common floating reference lines $L_1$ and $L_2$. Via each $C_1$ and $R_6$, unwanted signals common to each movable electrode 3, are compared and nullified by the circuits of transistors $Q_1$ and $Q_2$.

The apparatus could also be used to elucidate brain function. In one application a sensor stimulus such as a flash of light would be used as a fiducial point with which to examine a series of timed delay average responses of the brain. By serial averaging techniques the average brain response to many flashes of light could be determined by examining the potential field patterns of the plastic member 1 at say 10, 11, 12, etc. miliseconds after the light flash, so that the series of potential pattern changes which follow light flashes may be determined and thus indicate how the brain processes the information of a flash. It can be seen that by having a known fiducial point such as a known sensory stimuli, and by using averaging techniques to still further reduce unwanted signals, a potent means for studying internal voltage patterns of the brain is created with the use of the biopotential analog.

In another application, a prolonged brain stimulus such as a continuous tone of i.e. 500 Hz. is applied to an ear and with the components of amplifier 8 selected to respond only to signals with a repetition rate close to 500 times/second almost all unwanted signals such as noise may be excluded from the plastic member 1. The contents of hollow member 1 may then be searched for repetitive signals at about b 500 Hz. with a narrow band signal amplifier not unlike a low frequency radio receiver. This technique would be useful in studying general brain activity, auditory function, and methods communication with the brain.

As mentioned previously the member 1 (FIG. 1) need not be transparent but this enables the position of the probe 5 to be observed. Furthermore, the member 1 may, when transparent, be provided with scales to indicate the location of the probe within the member 1. Alternatively the fixed electrodes 2 may be designated by symbols marked on the member 1 and the positions of the probe 5 determined with reference to the fixed electrodes 2.

In FIG. 6 there is shown a hollow calvarium-shaped member 20 with (fixed) electrodes 21. The member 20 may be of an opaque or translucent material and has the open end at approximately the same dimensions as the interior to provide an unobstructed access for a probe 22. A circular rim 23 around the edge of the member 20 is graduated into a 360° scale. The probe 22 is graduated along its length by graduations 24 and a blade 25 is slidable along a vertical slot (not shown) in the probe 22 and is held captive therein. The blade 25 extends in the same direction as one of the arms of the probe 22, and has graduations 26 marked along its length.

In operation the probe 22 is moved around the interior of the member 20 to detect voltage differences in the liquid therein and the position of the probe 22 in determined by the graduations on the probe 22 relative to the blade 25, the graduations on the blade 25 relative to the rim 23 and the graduation on rim 23 indicated by the blade 25.

I claim:

1. An electroencephalograph apparatus, comprising a hollow calvarium-shaped member of an electrical insulating material, a plurality of fixed electrodes distributed over and attached to said member, each fixed electrode having an end portion exposed to the hollow interior in said member, a plurality of movable electrodes providing a movable electrode for each said fixed electrode, negative feedback and voltage signal averaging means connected to said fixed electrodes, voltage signal amplifying means electrically connecting each movable electrode to the corresponding fixed electrode therefor and connected to said voltage signal averaging means, such that differences only in signals applied to each movable electrode relative to the average of the voltage signals applied to all the movable electrodes will be amplified to a detectable magnitude and applied to the corresponding fixed electrode, an electrically conducting liquid in said member and covering said exposed end portions of said electrodes, a sensing probe movable within said hollow interior, for detecting voltage differences in said electrically conducting liquid in said member, said voltage differences being produced therein by said fixed electrodes, and means for indicating said voltage differences detected by said probe, whereby each said movable electrode may be electrically connected to the corresponding position on the scalp of a living body to the position of the corresponding fixed electrode thereto on said member, said probe may be moved within said liquid to detect a substantially equivalent voltage field therein to that of a brain within said scalp, and differences in said field may be indicated by said means for indicating said voltage differences.

2. An apparatus according to claim 1, wherein said member is transparent.

3. An apparatus according to claim 1, further comprising scale means for indicating any position of said probe within said member.

4. A method of obtaining electroencephalograh readings, comprising providing a hollow calvarium-shaped member filled with an electrically conducting liquid and with electrodes fixed at several spaced locations, applying movable electrodes to the scalp of a living body, at positions corresponding to the fixed electrodes, to obtain voltage signals therefrom, obtaining the average voltage of all of said voltage signals, comparing each said voltage signal with the average, amplifying differences only in said voltage signals to said average, applying said amplified differences to the corresponding one of said fixed electrodes, inserting a probe in said liquid in said member, detecting voltage differences in said liquid, and measuring said voltage differences.